F. C. BROWN.
FOOD WARMER.
APPLICATION FILED MAY 9, 1917.

1,272,205.

Patented July 9, 1918.
2 SHEETS—SHEET 1.

WITNESSES

INVENTOR
F. C. Brown,
BY Victor J. Evans
ATTORNEY

F. C. BROWN.
FOOD WARMER.
APPLICATION FILED MAY 9, 1917.
1,272,205.
Patented July 9, 1918.
2 SHEETS—SHEET 2.
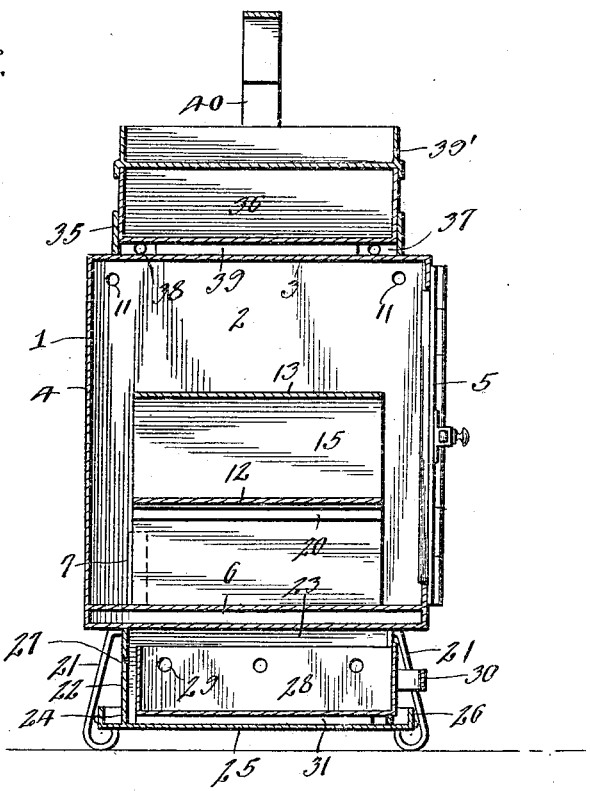
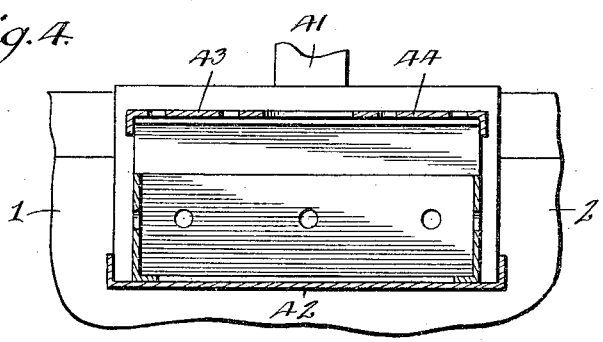
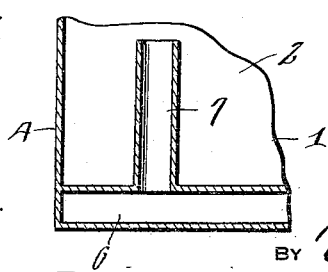
INVENTOR
F. C. Brown,
BY Victor J. Evans
ATTORNEY
WITNESSES

UNITED STATES PATENT OFFICE.

FIRMIN C. BROWN, OF CHICAGO, ILLINOIS.

FOOD-WARMER.

1,272,205.

Specification of Letters Patent.

Patented July 9, 1918.

Application filed May 9, 1917. Serial No. 167,569.

*To all whom it may concern:*

Be it known that I, FIRMIN C. BROWN, a citizen of the United States, residing at Chicago, in the county of Cook and State of Illinois, have invented new and useful Improvements in Food-Warmers, of which the following is a specification.

This invention is an improved warming device especially adapted for use where cooked meals are carried out from restaurants, hotels and dining cars and similar places to apartments, offices, residences and railroad cars and also adapted for use by automobile parties.

The present invention is an improvement on the food warmer for which Letters-Patent of the United States No. 980,057 were granted to me Dec. 27, 1910.

One object of the present invention is to effect improvements in the construction of the heater and adapt the same for the use of prepared fuel such as "Clark's carbon" as well as a lamp or other burner.

Another object is to provide a heater for use for heating water, or making tea or coffee or the like and which may be detachably fitted at one end of the food warmer.

Another object of the invention is to effect improvements in the construction of the food warmer whereby the same is provided with removable trays on its upper side for cold food and which serves to facilitate the serving of a meal.

With the above and other objects in view the invention consists in the construction, combination and arrangement of devices hereinafter described and claimed.

In the accompanying drawings:—

Fig. 2 is a vertical transverse sectional view of the same.

Figs. 4 and 5 are detailed views.

Figure 1:
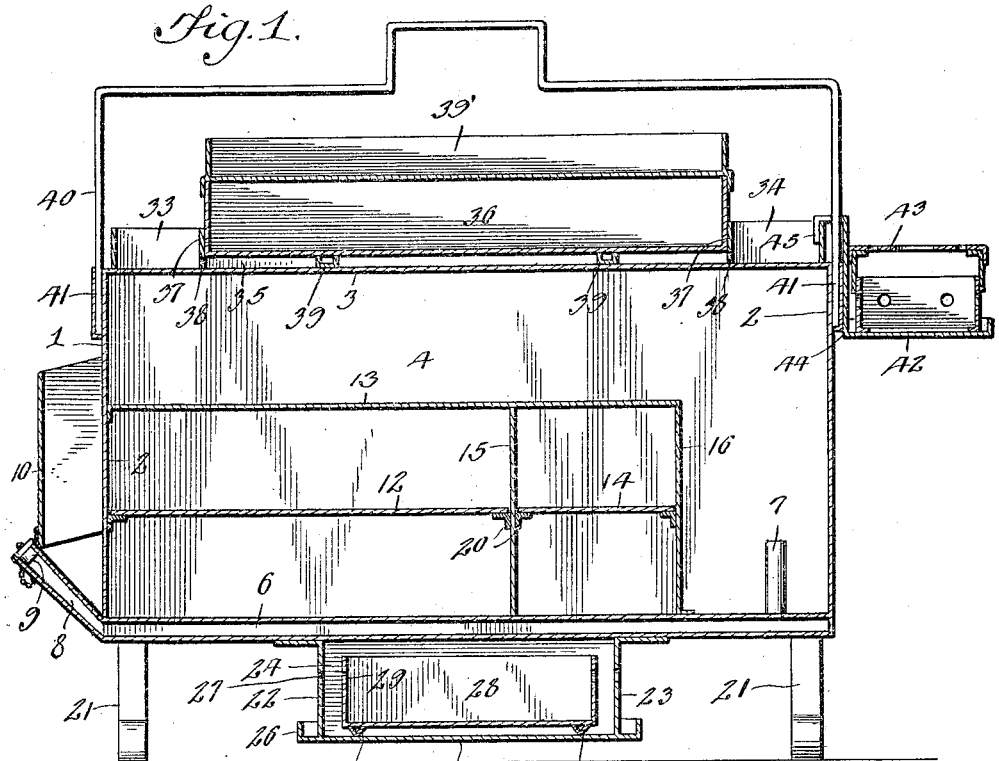
Figure 1 is a vertical longitudinal sectional view of a food warmer constructed and arranged in accordance with my invention.
Figure 3:
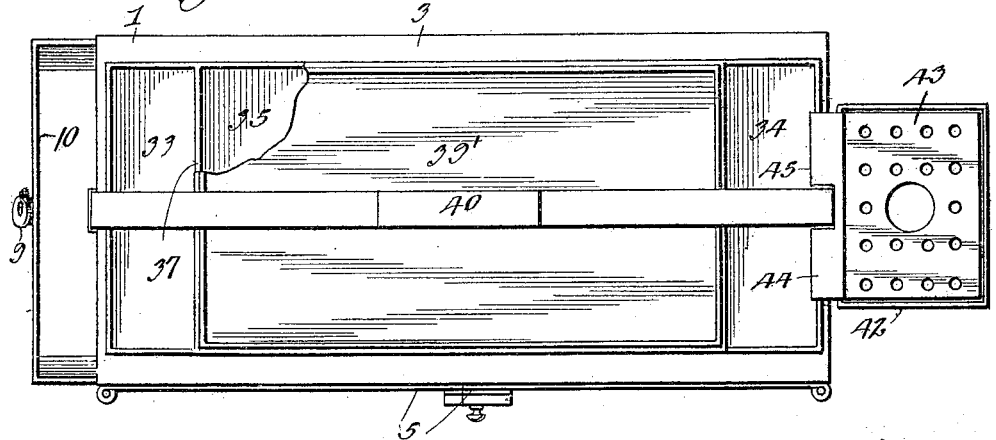
Fig. 3 is a plan of the same.

The body 1 of my improved food warmer is preferably made of sheet metal but may be constructed of any other suitable material and is here shown as of oblong rectangular form and provided with end walls 2, a top 3, a rear wall 4, and a pair of hinged front doors 5. The bottom of the body is formed by a steam generator or boiler 6 which extends from end to end and from the front to the rear side of the body. Steam can enter the food warmer from the boiler through a short tube 7 adjacent one corner of the boiler and water may be supplied to the boiler through an inclined pipe 8 which is arranged at one end of the body of the food warmer and is provided with a suitable stopper 9. On the same end of the body is a rack 10 for holding plates. To permit the escape of fumes from dishes of food in the warmer I provide the end walls with openings 11 at points near the top of the food warmer.

Arranged within the body of the warmer are shelves for supporting dishes, pans and the like. The arrangement of the shelves can be varied as desired but as here shown a plurality of shelves 12, 13 and 14 are supported by partitions 15, 16 and by one end wall of the body. The shelves 12 and 14 are detachable and are fitted on supporting flanges 20. A space is formed between the shelves and one end of the body and in which pans of food may be arranged in superposed relation or as desired. The front and rear sides of the shelves are spaced from the front and back of the body, as shown, so that a free circulation is provided for the steam throughout all parts of the body and over and under all of the shelves. Supporting legs 21 are provided for the food warmer and which are arranged under the ends thereof as shown.

A fire box 22 is arranged under the center of the food warmer and comprises side and end walls 23, 24 and a bottom 25. The bottom extends beyond the side and end walls and is provided with upturned flanges 26 and said side and end walls are provided with air inlet openings 27. The extensions formed by the extended parts of the bottom and the flanges thereof serve to receive any ashes or soot which may escape from the fire box. The bottom of the fire box is spaced from the floor, table, or other supporting surface on which the food warmer may be placed, and to prevent scorching or burning the same. A drawer 28 is arranged in and may be readily removed from the fire box and is provided with air openings 29 in its side walls as shown and with a handle 30 at the front end. This drawer is provided on the bottom with supporting legs 31 of suitable construction and which bear on the bottom of the fire box and support the drawer with the bottom thereof spaced above the bottom of the fire box so that a free circulation of air is afforded between the bottom of the fire box and the bottom of the drawer and to prevent the bottom of the fire box from becoming unduly heated.

Any suitable heater may be used in the drawer, such as an alcohol lamp but preferably a prepared fuel such as "Clark's carbon" will be employed as the same burns for a longer period than an alcohol lamp and is in other respects more convenient and efficient. However, I do not desire to limit myself in this particular as any suitable form of heater may be employed.

The food warmer is provided on the top with compartments 33, 34 for silver and the like and a compartment 35 between said compartments 33, 34 for the reception of a tray 36 in which food may be placed and which is to be served cold. The partition walls 37 between the said compartments are provided with air openings 38 and the said tray is provided with support legs 39 on its under side so that the bottom of the tray is spaced from the top of the body 1 and a free circulation of air is provided therebetween to prevent the tray from being heated. A cover tray 39' is also provided for the cold food tray and in which suitable dishes may also be placed.

A handle 40 is arranged above the body of the food warmer, extends from end to end thereof and is provided with downwardly turned end portions 41 which are secured to the central portions of the end walls of the body as shown.

I also provide a heater 42 which is adapted to receive a block of "Clark's carbon" or other suitable fuel or an alcohol or other form of lamp as preferred. The heater is provided with a removable top 43 and has a supporting bracket shelf 44 which has a central recess to clear one end of the handle and downwardly turned hooks 45 to engage over one end wall of one of the silver compartments, so that the said heater may be detachably secured on the end of the food warmer opposite that provided with the plate rack. This heater may be used for making tea or coffee and for other similar purposes and is especially convenient for use by automobile parties and tourists.

While I have herein shown and described a preferred form of my invention I would have it understood that changes may be made in the form, proportion and construction of the several parts without departing from the spirit of my invention and within the scope of the appended claim.

Having thus described my invention, I claim:—

A food warmer of the class described having a fire box connected to and suspended from the bottom thereof, said fire box being open at one side, and a drawer in the fire box removable therefrom through said open side thereof and arranged to contain a suitable heater, the said drawer being provided with means to support the bottom thereof in spaced relation to the bottom of the fire box, and the walls of the fire box and drawer being provided with air openings, the bottom of the fire box being provided with extensions at the sides and ends thereof to receive soot or the like which may be dropped from the fire box.

In testimony whereof I affix my signature.

FIRMIN C. BROWN.

Copies of this patent may be obtained for five cents each, by addressing the "Commissioner of Patents, Washington, D. C."